(12) United States Patent
Huang

(10) Patent No.: US 12,374,157 B2
(45) Date of Patent: Jul. 29, 2025

(54) FACIAL RECOGNITION METHOD AND APPARATUS

(71) Applicant: SHENZHEN XUMI YUNTU SPACE TECHNOLOGY CO., LTD., Shenzhen (CN)

(72) Inventor: Zeyuan Huang, Shenzhen (CN)

(73) Assignee: SHENZHEN XUMI YUNTU SPACE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/724,206

(22) PCT Filed: Jul. 26, 2022

(86) PCT No.: PCT/CN2022/107827
§ 371 (c)(1),
(2) Date: Jun. 26, 2024

(87) PCT Pub. No.: WO2023/124040
PCT Pub. Date: Jul. 6, 2023

(65) Prior Publication Data
US 2025/0061742 A1   Feb. 20, 2025

(30) Foreign Application Priority Data

Dec. 31, 2021   (CN) .......................... 202111656450.2

(51) Int. Cl.
*G06K 9/00*        (2022.01)
*G06N 3/04*        (2023.01)
(Continued)

(52) U.S. Cl.
CPC .............. *G06V 40/172* (2022.01); *G06N 3/04* (2013.01); *G06N 3/0464* (2023.01); *G06V 10/40* (2022.01);
(Continued)

(58) Field of Classification Search
CPC ........ G06V 10/40; G06V 10/42; G06V 10/44; G06V 10/443; G06V 10/451;
(Continued)

(56) References Cited

U.S. PATENT DOCUMENTS 10,528,846 B2 *   1/2020   Kim ...................... G06V 10/82
11,854,248 B2 *  12/2023   Wu ....................... G06V 10/82
(Continued)

FOREIGN PATENT DOCUMENTS

CN        111898412 A     11/2020
CN        112001932 A     11/2020
(Continued)

OTHER PUBLICATIONS

Zhenguo Yuan, Face Detection and Recognition Based on Visual Attention Mechanism Guidance Model in Unrestricted Posture, Scientific Programming, 2020, pp. 1-10, vol. 2020, Article ID 8861987.

*Primary Examiner* — Eric Rush
(74) *Attorney, Agent, or Firm* — Bayramoglu Law Offices LLC

(57) ABSTRACT

A facial recognition method and apparatus are provided. In the method, facial pose features and facial features can be fused; that is, detailed information of the facial pose features and the facial features can be fused, and a target facial feature and facial pose information of a facial image to be subjected to recognition are generated according to the fused features, such that accuracy of the determined target facial feature and facial pose information is improved, thereby improving accuracy of a user recognition result determined according to the target facial feature and the facial pose information.

6 Claims, 3 Drawing Sheets

(51) Int. Cl.
  *G06N 3/0464* (2023.01)
  *G06V 10/40* (2022.01)
  *G06V 10/44* (2022.01)
  *G06V 10/70* (2022.01)
  *G06V 10/74* (2022.01)
  *G06V 10/77* (2022.01)
  *G06V 40/16* (2022.01)

(52) U.S. Cl.
  CPC ............ *G06V 10/454* (2022.01); *G06V 10/70* (2022.01); *G06V 10/761* (2022.01); *G06V 10/77* (2022.01); *G06V 10/7715* (2022.01); *G06V 40/168* (2022.01); *G06V 40/169* (2022.01); *G06V 40/171* (2022.01); *G06T 2207/20084* (2013.01); *G06T 2207/30201* (2013.01)

(58) Field of Classification Search
  CPC ...... G06V 10/454; G06V 10/50; G06V 10/70; G06V 10/74; G06V 10/75; G06V 10/751; G06V 10/761; G06V 10/764; G06V 10/77; G06V 10/771; G06V 10/7715; G06V 10/82; G06V 40/00; G06V 40/10; G06V 40/16; G06V 40/161; G06V 40/165; G06V 40/168; G06V 40/169; G06V 40/171; G06V 40/172; G06V 40/173; G06V 40/174; G06V 40/175; G06V 40/176; G06N 3/00; G06N 3/02; G06N 3/04; G06N 3/044; G06N 3/0442; G06N 3/045; G06N 3/0464; G06T 2207/20081; G06T 2207/20084; G06T 2207/30196; G06T 2207/30201
  USPC ........ 382/100, 103, 115–118, 155–160, 181, 382/190, 203, 205, 206, 224–229, 279, 382/325
  See application file for complete search history.

(56) References Cited

U.S. PATENT DOCUMENTS

| | | | |
|---|---|---|---|
| 12,124,952 B2 * | 10/2024 | Javan Roshtkhari .. | G06V 40/10 |
| 2019/0130594 A1 | 5/2019 | Seyfi et al. | |
| 2020/0342360 A1 * | 10/2020 | Chen ...................... | G06V 10/82 |
| 2021/0264136 A1 * | 8/2021 | Wang ................... | G06V 40/172 |
| 2022/0129689 A1 * | 4/2022 | Kim ........................ | G06V 10/82 |
| 2023/0267725 A1 * | 8/2023 | Du .......................... | G06V 10/82 |
| | | | 382/156 |

FOREIGN PATENT DOCUMENTS

| | | |
|---|---|---|
| CN | 112418074 A | 2/2021 |
| CN | 114330565 A | 4/2022 |

* cited by examiner

FACIAL RECOGNITION METHOD AND APPARATUS

CROSS REFERENCE TO THE RELATED APPLICATIONS

This application is the national phase entry of International Application No. PCT/CN2022/107827, filed on Jul. 26, 2022, which is based upon and claims priority to Chinese Patent Application No. 202111656450.2, filed on Dec. 31, 2021, the entire contents of which are incorporated herein by reference.

TECHNICAL FIELD

The present disclosure relates to the field of data processing technologies, and in particular, to a facial recognition method and apparatus.

BACKGROUND

A facial recognition system is an emerging biological recognition technology, is a high-grade, precision and advanced technology with key problems tackled in the international science and technology field at present, and has broad development prospects. Most of existing facial detection technologies have good performance for faces in ideal environments, and have a poor environment generalization capability and performance effect for applications in complex environments, cross-working scenario applications, or the like. Particularly in a practical application scenario, especially when a facial pose is changed rapidly and violently, facial recognition precision of an existing method has a large gap from requirements of a practical application, and further research and improvement are required.

SUMMARY

In view of this, embodiments of the present disclosure provide a facial recognition method and apparatus, a computer device, and a computer-readable storage medium, so as to solve a problem in the prior art that a facial recognition result is inaccurate when a facial pose is changed rapidly and violently.

In a first aspect of the embodiments of the present disclosure, there is provided a facial recognition method, including:
  acquiring a facial image to be subjected to recognition;
  extracting facial pose features and facial features of the facial image to be subjected to recognition;
  generating a target facial feature and facial pose information of the facial image to be subjected to recognition according to the facial pose features and the facial features; and
  if the facial pose information meets a preset condition, determining a user recognition result of the facial image to be subjected to recognition according to the target facial feature of the facial image to be subjected to recognition.

In a second aspect of the embodiments of the present disclosure, there is provided a facial recognition apparatus, including:
  an image acquiring unit configured to acquire a facial image to be subjected to recognition;
  a feature extracting unit configured to extract facial pose features and facial features of the facial image to be subjected to recognition;
  an information generating unit configured to generate a target facial feature, facial pose information and a score vector corresponding to the facial pose information of the facial image to be subjected to recognition according to the facial pose features and the facial features; and
  a result determining unit configured to, if the facial pose information and the score vector corresponding to the facial pose information meet a preset condition, determine a user recognition result of the facial image to be subjected to recognition according to the target facial feature of the facial image to be subjected to recognition.

In a third aspect of the embodiments of the present disclosure, there is provided a computer device, including a memory, a processor and a computer program stored in the memory and runnable on the processor, wherein the processor, when executing the computer program, implements the steps of the above method.

In a fourth aspect of the embodiments of the present disclosure, there is provided a computer-readable storage medium storing a computer program, wherein the computer program, when executed by a processor, implements the steps of the above method.

Compared with the prior art, the embodiments of the present disclosure have the following beneficial effects: in the embodiments of the present disclosure, the facial image to be subjected to recognition can be acquired first; then, the facial pose features and the facial features of the facial image to be subjected to recognition can be extracted; then, the target facial feature and the facial pose information of the facial image to be subjected to recognition are generated according to the facial pose features and the facial features; and if the facial pose information meets the preset condition, the user recognition result of the facial image to be subjected to recognition is determined according to the target facial feature of the facial image to be subjected to recognition. In the present embodiment, since the facial pose features reflect spatial information of a face, and include structural features, edge features, and angle features of the face, and the facial features reflect a skin color, a texture, and other features of the face, the facial pose features and the facial features are fused; that is, detailed information of the facial pose features and the facial features can be fused, and the target facial feature and the facial pose information of the facial image to be subjected to recognition can be generated according to the fused features, such that accuracy of the determined target facial feature and facial pose information can be improved, thereby improving accuracy of the user recognition result determined according to the target facial feature and the facial pose information.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

In the following description, for the purpose of illustration instead of limitation, specific details such as a particular system structure and a technology are provided to make the embodiments of the present disclosure understood thoroughly. However, it should be understood by those skilled in the art that the present disclosure can also be implemented in other embodiments without the specific details. In other cases, detailed description of well-known systems, apparatuses, circuits and methods is omitted, so that the present disclosure is described without being impeded by unnecessary details.

A facial recognition method and apparatus according to embodiments of the present disclosure will be described in detail below with reference to the accompanying drawings.

In the prior art, most of existing facial detection technologies have good performance for faces in ideal environments, and have a poor environment generalization capability and performance effect for applications in complex environments, cross-working scenario applications, or the like. Particularly in a practical application scenario, especially when a facial pose is changed rapidly and violently, facial recognition precision of an existing method has a large gap from requirements of a practical application, and further research and improvement are required.

In order to solve the above problems, the present invention provides a facial recognition method; in the method, a facial image to be subjected to recognition can be acquired first; then, facial pose features and facial features of the facial image to be subjected to recognition can be extracted; then, a target facial feature and facial pose information of the facial image to be subjected to recognition are generated according to the facial pose features and the facial features; and if the facial pose information meets a preset condition, a user recognition result of the facial image to be subjected to recognition is determined according to the target facial feature of the facial image to be subjected to recognition. In the present embodiment, since the facial pose features reflect spatial information of a face, and include structural features, edge features, and angle features of the face, and the facial features reflect a skin color, a texture, and other features of the face, the facial pose features and the facial features are fused, and the target facial feature and the facial pose information of the facial image to be subjected to recognition are generated, such that accuracy of the determined target facial feature and facial pose information can be improved, thereby improving accuracy of the user recognition result determined according to the target facial feature and the facial pose information.

Figure 1:
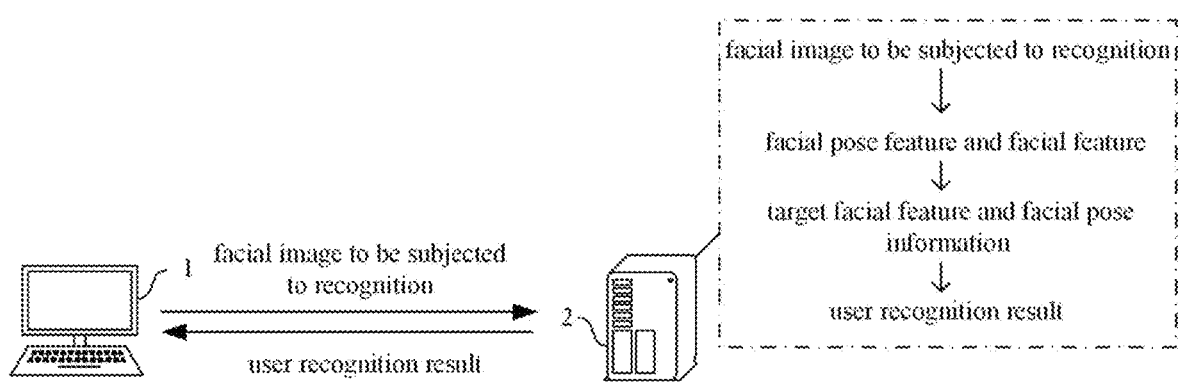
FIG. 1 is a schematic diagram of an application scenario of an embodiment of the present disclosure.

For example, the embodiment of the present invention may be applied to an application scenario as shown in FIG. 1. In this scenario, a terminal device 1 and a server 2 may be included.

The terminal device 1 may be hardware or software. When the terminal device 1 is hardware, the terminal device may be various electronic devices having an image collecting function and supporting communication with the server 2, including but not limited to smart phones, tablet computers, laptop portable computers, desktop computers, or the like; when the terminal device 1 is software, the terminal device may be installed in the electronic device as described above. The terminal device 1 may be implemented as a plurality of pieces of software or software modules, or may be implemented as a single piece of software or software module, which is not limited in the embodiment of the present disclosure. The server 2 may be a server providing various services, for example, a background server receiving a request sent by a terminal device establishing communication connection with the server, and the background server may receive and analyze the request sent by the terminal device, and generate a processing result. The server 2 may be a server, or a server cluster composed of a plurality of servers, or a cloud computing service center, which is not limited in the embodiment of the present disclosure.

It should be noted that the server 2 may be hardware or software. When the server 2 is hardware, the server may be various electronic devices providing various services for the terminal device 1. When the server 2 is software, the server may be plural pieces of software or software modules providing various services for the terminal device 1, or may be a single piece of software or software module providing various services for the terminal device 1, which is not limited in the embodiment of the present disclosure.

The terminal device 1 and the server 2 may be communicatively connected through a network. The network may be a wired network formed by connection using a coaxial cable, a twisted pair cable, and an optical fiber, or may be a wireless network which can interconnect various communication devices without wiring, for example, Bluetooth, Near Field Communication (NFC), Infrared, or the like, which is not limited in the embodiment of the present disclosure.

Specifically, a user may input a facial image to be subjected to recognition by the terminal device 1, and the terminal device 1 sends to-be-evaluated service data and a target evaluation method to the server 2. The server 2 first extracts facial pose features and facial features of the facial image to be subjected to recognition; can then generate a target facial feature and facial pose information of the facial image to be subjected to recognition according to the facial pose features and the facial features; if the facial pose information meets a preset condition, can determine a user recognition result of the facial image to be subjected to recognition according to the target facial feature of the facial image to be subjected to recognition; and returns the user recognition result of the facial image to be subjected to recognition to the terminal device 1, such that the terminal device 1 can show the user recognition result of the facial image to be subjected to recognition to the user. In this way, the facial pose features and the facial features are fused; that is, detailed information of the facial pose features and the facial features can be fused, and the target facial feature and the facial pose information of the facial image to be subjected to recognition can be generated according to the fused features, such that accuracy of the determined target facial feature and facial pose information can be improved, thereby improving accuracy of the user recognition result determined according to the target facial feature and the facial pose information.

It should be noted that specific types, numbers, and combinations of the terminal device 1, the server 2 and the network may be adjusted according to actual needs of the application scenario, which is not limited in the embodiment of the present disclosure.

It should be noted that the above application scenario is only shown for the convenience of understanding the present disclosure, and the embodiments of the present disclosure are not limited in any way in this respect. Rather, the embodiments of the present disclosure may be applied to any applicable scenario.

Figure 2:
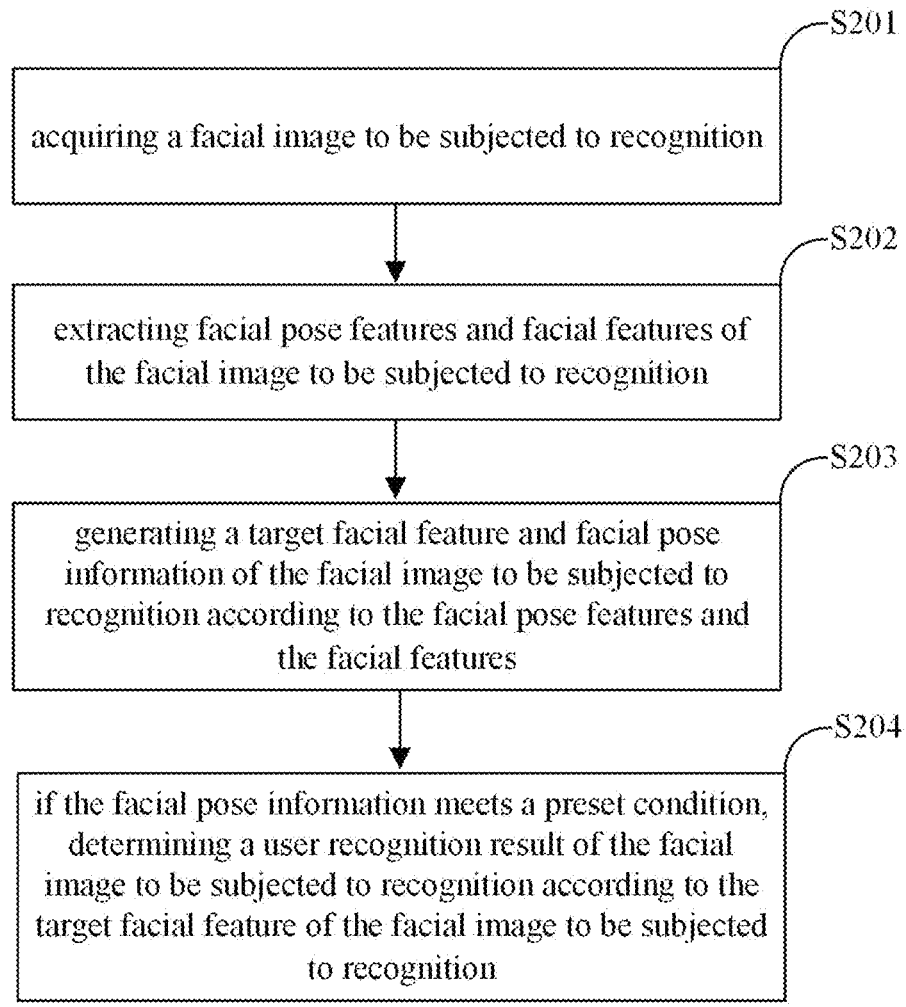
FIG. 2 is a flowchart of a facial recognition method according to the embodiment of the present disclosure.

FIG. 2 is a flowchart of a facial recognition method according to the embodiment of the present disclosure. The facial recognition method of FIG. 2 may be performed by the terminal device or the server of FIG. 1. As shown in FIG. 2, the facial recognition method includes:

S201: acquiring a facial image to be subjected to recognition.

In the present embodiment, the facial image to be subjected to recognition may be understood as an image required to be subjected to facial recognition. As an example, the facial image to be subjected to recognition may be collected by a monitoring camera mounted at a fixed position, or collected by a mobile terminal device, or read from a storage device in which images are stored in advance.

S202: extracting facial pose features and facial features of the facial image to be subjected to recognition.

After the facial image to be subjected to recognition is obtained, in order to accurately recognize a side face in the facial image to be subjected to recognition, the facial pose features and the facial features of the facial image to be subjected to recognition are required to be extracted first. The facial pose features reflect spatial information of a face, and may include, for example, structural features, edge features and angle features of the face; the facial features can reflect semantic information of a face skin color, a texture, an age, illumination, a race, or the like.

S203: generating a target facial feature and facial pose information of the facial image to be subjected to recognition according to the facial pose features and the facial features.

In the present embodiment, the facial pose features and the facial features may be fused, such that the facial features may be supplemented with information by using the facial pose features, so as to enrich information of the facial features. Then, the target facial feature and the facial pose information of the facial image to be subjected to recognition can be generated according to the facial pose features and the facial features, thereby improving accuracy of the determined target facial feature and facial pose information. The target facial feature may be understood as a feature vector including facial detail information (such as texture information, skin color information, or the like). The facial pose information can include a yaw angle, a pitch angle and a roll angle of the face, and the facial pose information can reflect a turning angle and a turning amplitude of the face.

S204: if the facial pose information meets a preset condition, determining a user recognition result of the facial image to be subjected to recognition according to the target facial feature of the facial image to be subjected to recognition.

If a face turning or head-down amplitude is too large, a pose angle of the facial image is also large, such that facial information available for recognition is little, and the face is easy to attack (for example, the face is easy to decrypt using an impersonated user photo). Therefore, in the present embodiment, it is required to first judge whether the facial pose information satisfies the preset condition, and in an implementation, as the preset condition, the yaw angle is less than or equal to a preset yaw angle threshold, the pitch angle is less than or equal to a preset pitch angle threshold, and the roll angle is less than or equal to a preset roll angle threshold.

If the facial pose information meets the preset condition, the user recognition result of the facial image to be subjected to recognition can be determined according to the target facial feature of the facial image to be subjected to recognition. As an example, in the present embodiment, a plurality of pieces of preset user information may be preset, and each piece of preset user information has a preset user facial feature corresponding thereto; in the present embodiment, similarities between the target facial feature of the facial image to be subjected to recognition and the preset user facial features may be determined first; for example, a vector distance may be measured by using an Euclidean distance, a cosine distance, or the like, so as to determine the similarities according to the vector distances; then, the user information corresponding to the preset user facial feature with the largest similarity can be used as the user recognition result of the facial image to be subjected to recognition.

Compared with the prior art, the embodiments of the present disclosure have the following beneficial effects: in the embodiments of the present disclosure, the facial image to be subjected to recognition can be acquired first; then, the facial pose features and the facial features of the facial image to be subjected to recognition can be extracted; then, the target facial feature and the facial pose information of the facial image to be subjected to recognition are generated according to the facial pose features and the facial features; and if the facial pose information meets the preset condition, the user recognition result of the facial image to be subjected to recognition is determined according to the target facial feature of the facial image to be subjected to recognition. In the present embodiment, since the facial pose features reflect spatial information of a face, and include structural features, edge features, and angle features of the face, and the facial features reflect a skin color, a texture, and other features of the face, the facial pose features and the facial features are fused; that is, detailed information of the facial pose features and the facial features can be fused, and the target facial feature and the facial pose information of the facial image to be subjected to recognition can be generated according to the fused features, such that accuracy of the determined target facial feature and facial pose information can be improved, thereby improving accuracy of the user recognition result determined according to the target facial feature and the facial pose information.

Next, an implementation of S202, i.e., a way of extracting the facial pose features and the facial features of the facial image to be subjected to recognition will be described. In the present embodiment, the facial pose features may include N facial pose features, the facial features may include N facial features, and S202 may include:

S202a: for a first facial feature, inputting the facial image to be subjected to recognition into a first convolutional layer to obtain the first facial feature;

S202b: for a first facial pose feature, inputting the facial image to be subjected to recognition into a first residual block to obtain the first facial pose feature;

S202c: for an ith facial pose feature, inputting an (i−1)th facial pose feature into an ith residual block to obtain the ith facial pose feature; and S202d: for an ith facial feature, inputting the (i−1)th facial pose feature and an (i−1)th facial feature into an ith convolutional layer to obtain the ith facial feature; i being greater than or equal to 2, i being less than or equal to N, and N, i being both positive integers.

In the present embodiment, two models may be provided and are a facial feature extracting model and a facial pose feature extracting model respectively. The facial pose feature extracting model may include at least N residual blocks which are the first residual block, a second residual block, .

..., and an Nth residual block respectively, and the N residual blocks are in cascade connection; in an implementation, the facial pose feature extracting model may include at least 3 residual blocks which are formed by 2, 3, and 2 residual networks respectively, a network architecture in each residual network may include two convolutional layers (i.e., conv), two batch normalization layers (i.e., bn), and two hyperbolic tangent activation functions (i.e., tanh), a specific connection structure is conv+bn+tanh+conv+bn+tanh, and numbers of output feature map channels of the three residual blocks are 64, 128 and 256 respectively. It should be noted that the reason why the hyperbolic tangent activation function is used is that each feature calculation can be performed within (−1, 1), which is beneficial to a subsequent pose calculation. It can be understood that the facial image to be subjected to recognition can be input into the first residual block to obtain the first facial pose feature; the first facial pose feature can be input into the second residual block to obtain the second facial pose feature; . . . ; the (i−1)th facial pose feature can be input into the ith residual block to obtain the ith facial pose feature; i is greater than or equal to 2, i is less than or equal to N, and N, i are both positive integers.

The facial feature extracting model may include at least N convolutional layers which are the first convolutional layer, a second convolutional layer, . . . , and an Nth convolutional layer, and the N convolutional layers are in cascade connection. The facial feature extracting model can be an IResNet-50 network, and each convolutional layer can include a convolution operator with a convolution kernel size of 3×3 and a channel number of 192 and a convolution operator with a convolution kernel size of 1×1 and a channel number of 128. In the present embodiment, the facial image to be subjected to recognition is input into the first convolutional layer to obtain the first facial feature; the first facial pose feature (for example, a dimension is (28, 28, 64)) and the first facial feature (for example, a dimension is (28, 28, 128)) are input into the second convolutional layer (for example, the first facial pose feature and the first facial feature can be fused, and then, the fused feature is input into the second convolutional layer) to obtain the second facial feature; . . . ; the (i−1)th facial pose feature and the (i−1)th facial feature are input into the ith convolutional layer to obtain the ith facial feature; i is greater than or equal to 2, i is less than or equal to N, and N, i are both positive integers. It should be emphasized that the reason why the facial pose feature as a supplement and the facial feature are input into the convolutional layer to calculate the next facial feature is that spatial information is more considered in pose information processing, the extraction of the structural features, the edge features and the angle features of the face is complete, but the semantic information of the age, the illumination, the race, the skin color, the texture, or the like, is required to be considered in the facial feature extraction, and certain defects and semantic confusion exist in the spatial structure, and therefore, the addition of the facial pose features extracted by the facial pose feature extracting model into the facial feature extracting model brings effective supplements to information processing of the facial features.

It should be noted that the number of the residual blocks in the facial pose feature extracting model is smaller than the number of the convolutional layers and the number of the channels in the facial feature extracting model, and the reason is that the facial pose feature extracting model processes relatively single semantic information and does not require a relatively large quantity of calculations.

Next, an implementation of S203, i.e., a way of generating the target facial feature and the facial pose information of the facial image to be subjected to recognition will be described. In the present embodiment, the step of generating a target facial feature of the facial image to be subjected to recognition according to the facial pose features and the facial features in S203 may include:

inputting the Nth facial pose feature and the Nth facial feature into an (N+1)th convolutional layer to obtain the target facial feature of the facial image to be subjected to recognition.

In the present embodiment, the facial feature extracting model further includes the (N+1)th convolutional layer, and the Nth facial pose feature and the Nth facial feature may be input into the (N+1)th convolutional layer to obtain the target facial feature of the facial image to be subjected to recognition.

In the present embodiment, the step of generating facial pose information of the facial image to be subjected to recognition according to the facial pose features and the facial features in S203 may include:

step a: generating attention diagrams corresponding to the facial pose features according to the facial pose features.

In the present embodiment, all the facial pose features may be downsampled first, such that dimensions of all the facial pose features are the same. Then, each facial pose feature is input into an attention model to obtain the attention diagram corresponding to the facial pose feature. The attention model includes a convolution operator with a convolution kernel size of 1×1 and a channel number of 1 and a sigmoid function. For example, the dimension of one facial pose feature is (28, 28, 64), the facial pose feature is firstly subjected to 2 convolution calculations with a convolution kernel size of 3×3, a step size of 2 and a channel number of 64, the dimension is reduced to (7, 7, 64), and then, a 1×1 convolution calculation and a sigmoid calculation are introduced to obtain a corresponding attention diagram with a dimension of (7, 7, 1), and then, 3 dimensions can be changed to 1 dimension to obtain the final dimension of the attention diagram of (7, 7, 1).

Step b: generating attention diagrams corresponding to the facial features according to the facial features.

In the present embodiment, all the facial features may be downsampled first, such that dimensions of all the facial features are the same. Then, each facial feature is input into the attention model to obtain the attention diagram corresponding to the facial feature. The attention model includes a convolution operator with a convolution kernel size of 1×1 and a channel number of 1 and a sigmoid function. For example, the dimension of one facial feature is (28, 28, 64), the facial feature is firstly subjected to 2 convolution calculations with a convolution kernel size of 3×3, a step size of 2 and a channel number of 64, the dimension is reduced to (7, 7, 64), and then, a 1×1 convolution calculation and a sigmoid calculation are introduced to obtain a corresponding attention diagram with a dimension of (7, 7, 1), and then, 3 dimensions can be changed to 1 dimension to obtain the final dimension of the attention diagram of (7, 7, 1).

Step c: obtaining a full-space attention diagram according to the attention diagrams corresponding to the facial pose features, the attention diagrams corresponding to the facial features and the Nth facial pose feature.

In the present embodiment, double-stream attention diagrams can be first generated according to the attention diagrams corresponding to the facial pose features and the attention diagrams corresponding to the facial features. For example, an ith double-stream attention diagram may be generated according to the attention diagram corresponding to the ith facial pose feature and the attention diagram corresponding to the ith facial feature; specifically, the ith double-stream attention diagram $D_1$ can be calculated using the following formula, $D_i$=reshape($[A,B]^T W_1$); wherein A is the attention diagram corresponding to the facial feature, and B is the attention diagram corresponding to the facial pose feature; $W_1$ is a learning parameter matrix, the dimension of the matrix is (7×7×2, q×7×7), each row of $W_1$ represents associated values of each point and other points in a space, but association can be in various forms, and therefore, q forms of association learning are introduced; reshape( ) is a function transforming a matrix into a matrix with a particular dimension.

Then, a deep-shallow attention diagram can be generated according to the attention diagrams corresponding to the facial features. For example, one deep-shallow attention diagram can be generated according to the attention diagrams corresponding to all the facial features. Specifically, the deep-shallow attention diagram E can be calculated using the following formula: E=reshape($[A_1, A_2, \ldots, A_x]^T W_2$), reshape( ) is a function transforming a matrix into a matrix with a particular dimension, A is the attention diagram corresponding to the facial feature, N is the number of the facial features, $W_2$ is a learning parameter matrix, $W_2$ has a matrix dimension of (7*7*2, q'*q), the parameter q' can be set to 4, q' also plays a partition role here, and the dimension of E is (q', q).

Then, the full-space attention diagram can be obtained according to the double-stream attention diagrams, the deep-shallow attention diagram and the Nth facial pose feature. For example, the full-space attention diagram R can be calculated using the following formula: R=$(E^T D_1 + E^T D_2 + \ldots + E^T D_N)^T P_N$, wherein E is the deep-shallow attention diagram, $D_i$ is the ith double-stream attention diagram, 1≤i≤N, and $P_N$ is the Nth facial pose feature.

Step d: generating the facial pose information of the facial image to be subjected to recognition according to the full-space attention diagram.

In the present embodiment, the facial pose information of the facial image to be subjected to recognition and a score vector corresponding to the facial pose information may be generated according to the full-space attention diagram. The score vector corresponding to the facial pose information is used for evaluating richness of whole facial information (which refers to discriminant information contained in a facial picture), and it can be understood that the higher the score vector is, the higher the richness of the whole facial information is, and conversely, the lower the score vector is, the lower the richness of the whole facial information is. Specifically, the facial pose information O of the facial image to be subjected to recognition can be calculated using the following formula: O=sigmoid ((relu($R^T W_3$))$^T W_4$), wherein R is the full-space attention diagram, $W_3$ and $W_4$ are parameter matrices, and dimensions of $W_3$ and $W_4$ are (256, 128) and (128, 1) respectively.

It can be understood that the full-space attention diagram integrates various forms of full-space attention information, deep-shallow-layer poses (i.e., the deep-shallow attention diagram) and whole facial feature information (i.e., the Nth facial pose feature), such that the facial pose information of the facial image to be subjected to recognition and the score vector corresponding to the facial pose information generated according to the full-space attention diagram are more accurate.

Correspondingly, the if the facial pose information meets a preset condition, determining a user recognition result of the facial image to be subjected to recognition according to the target facial feature of the facial image to be subjected to recognition may include:

if the facial pose information and the score vector corresponding to the facial pose information meet the preset condition, determining the user recognition result of the facial image to be subjected to recognition according to the target facial feature of the facial image to be subjected to recognition.

As the preset condition, the yaw angle is smaller than or equal to a preset yaw angle threshold, the pitch angle is smaller than or equal to a preset pitch angle threshold, the roll angle is smaller than or equal to a preset roll angle threshold, and the score vector corresponding to the facial pose information is larger than or equal to a preset score. It should be noted that when the score vector corresponding to the facial pose information is smaller than the preset score, the face is easy to attack (for example, the face is easy to decrypt using an impersonated user photo), and therefore, the score vector corresponding to the facial pose information is required to be larger than or equal to the preset score.

It should be noted that the above embodiment may be applied to a facial recognition model, and a training process of the facial recognition model may be described as follows.

In the present embodiment, N class centers (one positive class center and N−1 negative class centers), i.e., N vectors, can be introduced. These vectors and a facial vector T (after normalization) are subjected to point multiplication to obtain N values representing similarities x of the current face to the N class centers. In a general training mode, the N similarities x are subjected to a softmax operation, and then, cross entropy is calculated. But such decision boundaries are inaccurate and the training mode is inefficient. Therefore, in the present embodiment, the similarity between T and the positive class center can be set to x+, and x+ should be obtained by subtracting a decision value related to the pose and a score value. The larger the subtracted decision value, the smaller the decision boundary of the facial feature. If the yaw angle is y, the pitch angle is p, the roll angle is r, the score value is s, and the decision value is m, the formula is as follows:

$$x_+ = x_+ - m$$

$$\text{wherein } m = m_0 + \left(1 - \frac{f(y-i) + f(p-i) + f(r-i) + f(1-s-i)}{4(1-i)}\right) m_1, \text{ and}$$

$$f(t) = \begin{cases} 0.1, & \text{if } t < -0.1 \\ \text{abs}(t), & \text{if } -0.1 < t < 0 \\ t, & \text{if } t > 0 \end{cases}$$

In the above formula, f is a function; $m_0$ and $m_1$ are hyper-parameters; for example, $m_0$=0.2, and $m_1$=0.2.

In the above formula, i determines faces which are currently given larger decision values and smaller decision boundaries. Generally speaking, the larger the m is, the tighter the decision boundary is, the closer the facial feature should be to the class center, and the larger the generated gradient is. When i is set to 0, the above formula gives a larger decision value, a smaller decision boundary and a larger gradient to the face with a small yaw angle, a small pitch angle, a small roll angle and a high score value; when i is gradually increased, the above formula gives a larger decision value, a smaller decision boundary and a larger gradient to the face with a large yaw angle, a large pitch angle, a large roll angle and a low score value. That is, when i is 0, the network is mainly trained for a front face, and a gradient is given to the front face; when i is gradually increased, the network is mainly trained for the side face, and a gradient is given to the side face.

The facial recognition model has a training decision technical solution that when the model starts to be trained, i is set to 0. Subsequently, model loss may be gradually decreased. When precision of the model on a verification set is gradually increased, i may be gradually increased with an increment of 0.1; for example, i may be increased from 0 to 0.1, 0.1 to 0.2, and so on. The precision on the verification set is continuously observed. Once the precision is reduced, i should be reduced by 0.1, and after training is performed for a period of time, an attempt is made to increase i back to the original value. If the precision cannot be continuously increased all the time after i is repeatedly increased to the original value 3 times, i is reduced by 0.1, and the training is finished after fitting. At this point, obtained spatial distribution of faces shows reasonable distribution in which faces with small angles are located near the class center and faces with large angles are located at an edge in a class.

Since the spatial distribution is reasonable, in an inference process, a better feature expression of one face under a large pose can be obtained, and three pose angles and the score value can also be directly obtained. Therefore, face comparison is more flexible, and if pose angles of two pictures in the face comparison are too large, the comparison can be given up.

All the above optional technical solutions may be combined arbitrarily to form optional embodiments of the present disclosure, and are not repeated herein.

An apparatus according to the embodiments of the present disclosure is described below, and may be configured to perform the method according to the embodiments of the present disclosure. For details not disclosed in the embodiments of the apparatus according to the present disclosure, reference is made to the embodiments of the method according to the present disclosure.

Figure 3:
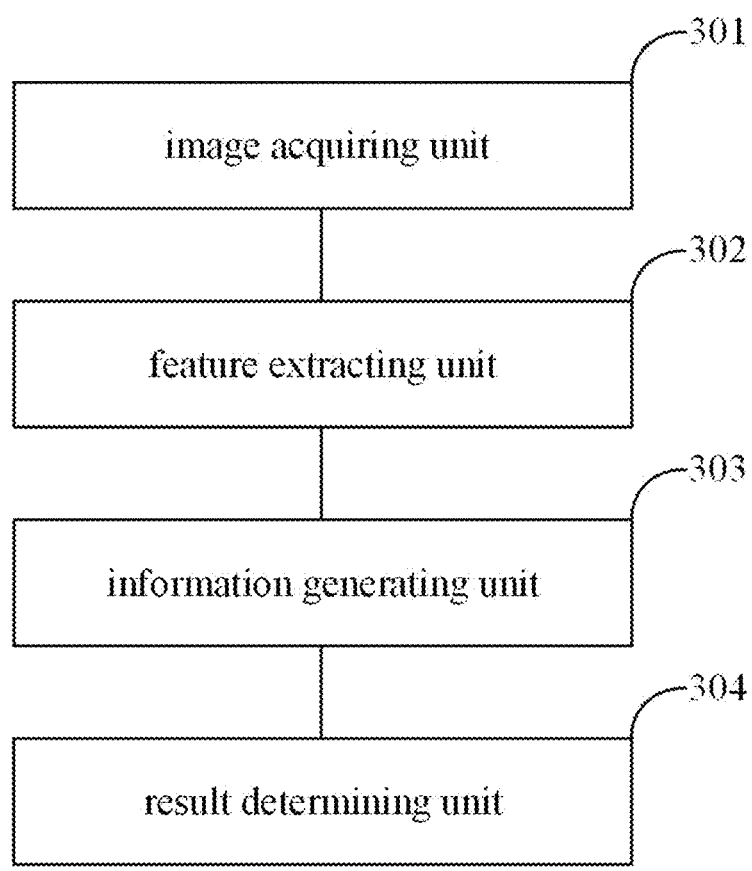
FIG. 3 is a block diagram of a facial recognition apparatus according to the embodiment of the present disclosure.

FIG. 3 is a schematic diagram of a facial recognition apparatus according to the embodiment of the present disclosure. As shown in FIG. 3, the facial recognition apparatus includes:

an image acquiring unit 301 configured to acquire a facial image to be subjected to recognition;

a feature extracting unit 302 configured to extract facial pose features and facial features of the facial image to be subjected to recognition;

an information generating unit 303 configured to generate a target facial feature, facial pose information and a score vector corresponding to the facial pose information of the facial image to be subjected to recognition according to the facial pose features and the facial features; and a result determining unit 304 configured to, if the facial pose information and the score vector corresponding to the facial pose information meet a preset condition, determine a user recognition result of the facial image to be subjected to recognition according to the target facial feature of the facial image to be subjected to recognition.

Optionally, the facial pose features include N facial pose features, and the facial features include N facial features; the feature extracting unit 302 is configured to:

for a first facial feature, input the facial image to be subjected to recognition into a first convolutional layer to obtain the first facial feature;

for a first facial pose feature, input the facial image to be subjected to recognition into a first residual block to obtain the first facial pose feature;

for an ith facial pose feature, input an (i−1)th facial pose feature into an ith residual block to obtain the ith facial pose feature; and for an ith facial feature, input the (i−1)th facial pose feature and an (i−1)th facial feature into an ith convolutional layer to obtain the ith facial feature; i being greater than or equal to 2, i being less than or equal to N, and N, i being both positive integers.

Optionally, the information generating unit 303 is configured to:

input the Nth facial pose feature and the Nth facial feature into an (N+1)th convolutional layer to obtain the target facial feature of the facial image to be subjected to recognition.

Optionally, the information generating unit 303 is configured to:

generate attention diagrams corresponding to the facial pose features according to the facial pose features;

generate attention diagrams corresponding to the facial features according to the facial features;

obtain a full-space attention diagram according to the attention diagrams corresponding to the facial pose features, the attention diagrams corresponding to the facial features and the Nth facial pose feature; and generate the facial pose information of the facial image to be subjected to recognition according to the full-space attention diagram.

Optionally, the information generating unit 303 is specifically configured to:

generate double-stream attention diagrams according to the attention diagrams corresponding to the facial pose features and the attention diagrams corresponding to the facial features;

generate a deep-shallow attention diagram according to the attention diagrams corresponding to the facial features; and obtain the full-space attention diagram according to the double-stream attention diagrams, the deep-shallow attention diagram and the Nth facial pose feature.

Optionally, the information generating unit 303 is specifically configured to:

generate the facial pose information of the facial image to be subjected to recognition and a score vector corresponding to the facial pose information according to the full-space attention diagram;

correspondingly, the result determining unit 304 is configured to:

if the facial pose information and the score vector corresponding to the facial pose information meet the preset condition, determine the user recognition result of the facial image to be subjected to recognition according to the target facial feature of the facial image to be subjected to recognition.

Optionally, the facial pose information includes a yaw angle, a pitch angle and a roll angle; as the preset condition, the yaw angle is smaller than or equal to a preset yaw angle threshold, the pitch angle is smaller than or equal to a preset pitch angle threshold, the roll angle is smaller than or equal to a preset roll angle threshold, and the score vector corresponding to the facial pose information is larger than or equal to a preset score.

Optionally, the result determining unit 304 is configured to:
   determine similarities between the target facial feature of the facial image to be subjected to recognition and preset user facial features; and
   take user information corresponding to the preset user facial feature with the largest similarity as the user recognition result of the facial image to be subjected to recognition.

The technical solution in the embodiment of the present disclosure is the facial recognition apparatus, including: the image acquiring unit configured to acquire the facial image to be subjected to recognition; the feature extracting unit configured to extract the facial pose features and the facial features of the facial image to be subjected to recognition; the information generating unit configured to generate the target facial feature, the facial pose information and the score vector corresponding to the facial pose information of the facial image to be subjected to recognition according to the facial pose features and the facial features; and the result determining unit configured to, if the facial pose information and the score vector corresponding to the facial pose information meet the preset condition, determine the user recognition result of the facial image to be subjected to recognition according to the target facial feature of the facial image to be subjected to recognition. In the present embodiment, since the facial pose features reflect spatial information of a face, and include structural features, edge features, and angle features of the face, and the facial features reflect a skin color, a texture, and other features of the face, the facial pose features and the facial features are fused; that is, detailed information of the facial pose features and the facial features can be fused, and the target facial feature and the facial pose information of the facial image to be subjected to recognition can be generated according to the fused features, such that accuracy of the determined target facial feature and facial pose information can be improved, thereby improving accuracy of the user recognition result determined according to the target facial feature and the facial pose information.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present disclosure.

Figure 4:
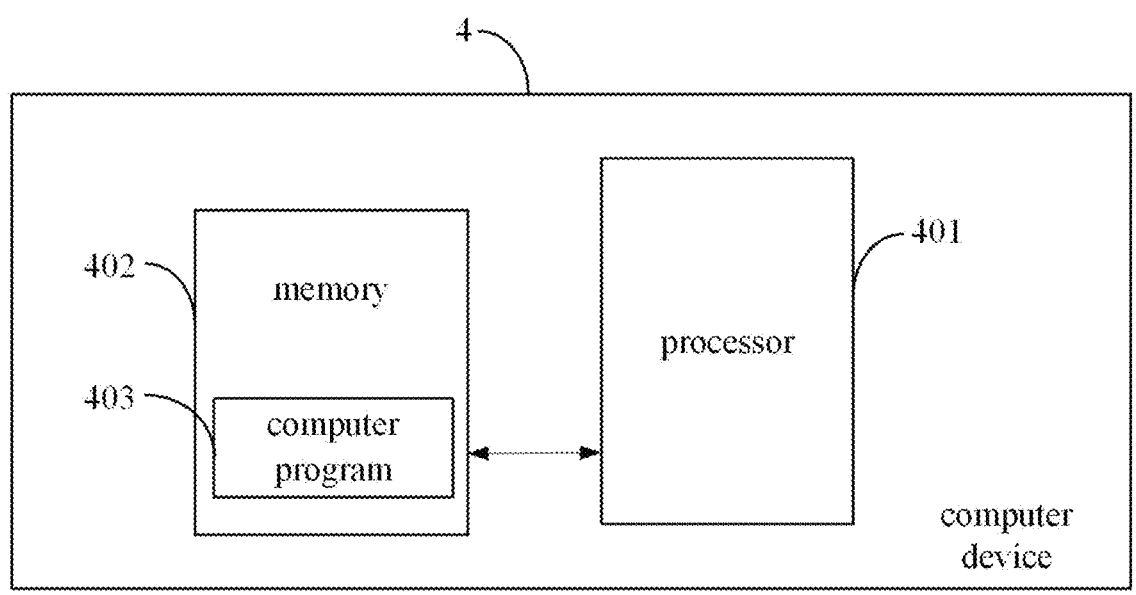
FIG. 4 is a schematic diagram of a computer device according to the embodiment of the present disclosure.

FIG. 4 is a schematic diagram of a computer device 4 according to the embodiment of the present disclosure. As shown in FIG. 4, the computer device 4 according to the present embodiment includes: a processor 401, a memory 402, and a computer program 403 stored in the memory 402 and executable on the processor 401. The steps in the various method embodiments described above are implemented when the processor 401 executes the computer program 403. Alternatively, the processor 401 achieves the functions of each module/unit in each apparatus embodiment described above when executing the computer program 403.

Exemplarily, the computer program 403 may be partitioned into one or more modules/units, which are stored in the memory 402 and executed by the processor 401 to complete the present disclosure. One or more of the modules/units may be a series of computer program instruction segments capable of performing specific functions, the instruction segments describing the execution of the computer program 403 in the computer device 4.

The computer device 4 may be a desktop computer, a notebook, a palm computer, a cloud server or another computer device. The computer device 4 may include, but is not limited to, the processor 401 and the memory 402. Those skilled in the art may understand that a structure shown in FIG. 4 is only an example of the computer device 4 and does not limit the computer device 4, which may include more or fewer components than those shown in the drawings, or some components may be combined, or a different component deployment may be used. For example, the computer device may further include an input/output device, a network access device, a bus, or the like.

The processor 401 may be a Central Processing Unit (CPU), or other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may be any general processor, or the like.

The memory 402 may be an internal storage unit of the computer device 4, for example, a hard disk or memory of the computer device 4. The memory 402 may also be an external storage device of the computer device 4, such as a plug-in hard disk, a Smart Media Card (SMC), a Secure Digital (SD) Card, a Flash Card, or the like, configured on the computer device 4. Further, the memory 402 may also include both the internal storage unit and the external storage device of the computer device 4. The memory 402 is configured to store the computer program and other programs and data required by the computer device. The memory 402 may be further configured to temporarily store data which has been or will be outputted.

It may be clearly understood by those skilled in the art that, for convenient and brief description, division of the above functional units and modules is used as an example for illustration. In practical application, the above functions can be allocated to different functional units and modules and implemented as required; that is, an internal structure of the apparatus is divided into different functional units or modules to accomplish all or some of the functions described above. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of all the functional units or modules are merely for facilitating the differentiation, but are not intended to limit the protection scope of this disclosure. For a specific working process of the units or modules in the above system, reference may be made to the corresponding process in the foregoing method embodiments, which is not repeated herein.

In the above embodiments, the description of each embodiment has its own emphasis. For a part not described in detail in one embodiment, reference may be made to relevant description of other embodiments.

Those of ordinary skill in the art would appreciate that the units and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may achieve the described functions in different methods for each particular application, but such implementation should not be considered beyond the scope of the present disclosure.

In the embodiments according to the present disclosure, it is to be understood that the disclosed apparatus/computer device and method can be implemented in other ways. For example, the embodiment of the apparatus/computer device described above is merely schematic. For example, the division of the modules or units is merely logical function division, and there may be other division manners in an actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between apparatuses or units may be implemented in an electric form, a mechanical form, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist alone physically, or two or more units are integrated into one unit. The integrated unit may be implemented in a form of hardware or in a form of a software functional unit.

The integrated module/unit may be stored in a computer-readable storage medium when implemented in the form of the software functional unit and sold or used as a separate product. Based on such understanding, all or some of the processes in the method according to the above embodiments may be realized in the present disclosure, or completed by the computer program instructing related hardware, the computer program may be stored in the computer-readable storage medium, and when the computer program is executed by the processor, the steps of the above method embodiments may be realized. The computer program may include a computer program code, which may be in a form of a source code, an object code or an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include the electrical carrier signal and the telecommunication signal.

The above embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present disclosure, and should be included in the protection scope of the present disclosure.

What is claimed is:

1. A facial recognition method, comprising:
   acquiring a facial image to be subjected to recognition;
   extracting facial pose features and facial features of the facial image to be subjected to the recognition;
   generating a target facial feature and facial pose information of the facial image to be subjected to the recognition according to the facial pose features and the facial features; and
   if the facial pose information meets a preset condition, determining a user recognition result of the facial image to be subjected to the recognition according to the target facial feature of the facial image to be subjected to the recognition;
   wherein the facial pose features comprise N facial pose features, and the facial features comprise N facial features; the step of extracting the facial pose features and the facial features of the facial image to be subjected to the recognition comprises:
   for a first facial feature of the facial features, inputting the facial image to be subjected to the recognition into a first convolutional layer to obtain the first facial feature;
   for a first facial pose feature of the facial pose features, inputting the facial image to be subjected to the recognition into a first residual block to obtain the first facial pose feature;
   for an ith facial pose feature of the facial pose features, inputting an (i−1)th facial pose feature of the facial pose features into an ith residual block to obtain the ith facial pose feature; and
   for an ith facial feature of the facial features, inputting the (i−1)th facial pose feature of the facial pose features and an (i−1)th facial feature of the facial features into an ith convolutional layer to obtain the ith facial feature of the facial features; i being greater than or equal to 2, i being less than or equal to N, and N, i being both positive integers; and wherein the step of generating the facial pose information
   of the facial image to be subjected to the recognition according to the facial pose features and the facial features comprises:
   generating attention diagrams corresponding to the facial pose features according to the facial pose features;
   generating attention diagrams corresponding to the facial features according to the facial features;
   obtaining a full-space attention diagram according to the attention diagrams corresponding to the facial pose features, the attention diagrams corresponding to the facial features, and an Nth facial pose feature; and
   generating the facial pose information of the facial image to be subjected to the recognition according to the full-space attention diagram.

2. The method according to claim 1, wherein the step of generating the target facial feature of the facial image to be subjected to the recognition according to the facial pose features and the facial features comprises:
   inputting an Nth facial pose feature of the facial pose features and an Nth facial feature of the facial features into an (N+1)th convolutional layer to obtain the target facial feature of the facial image to be subjected to the recognition.

3. The method according to claim 1, wherein the step of obtaining the full-space attention diagram according to the attention diagrams corresponding to the facial pose features, the attention diagrams corresponding to the facial features, and the Nth facial pose feature comprises:

generating double-stream attention diagrams according to the attention diagrams corresponding to the facial pose features and the attention diagrams corresponding to the facial features;

generating a deep-shallow attention diagram according to the attention diagrams corresponding to the facial features; and obtaining the full-space attention diagram according to the double-stream attention diagrams, the deep-shallow attention diagram, and the Nth facial pose feature.

4. The method according to claim 1, wherein the step of generating the facial pose information of the facial image to be subjected to the recognition according to the full-space attention diagram comprises:

generating the facial pose information of the facial image to be subjected to the recognition and a score vector corresponding to the facial pose information according to the full-space attention diagram;

correspondingly, the step of, if the facial pose information meets the preset condition, determining the user recognition result of the facial image to be subjected to the recognition according to the target facial feature of the facial image to be subjected to the recognition comprises:

if the facial pose information and the score vector corresponding to the facial pose information meet the preset condition, determining the user recognition result of the facial image to be subjected to the recognition according to the target facial feature of the facial image to be subjected to the recognition.

5. The method according to claim 4, wherein the facial pose information comprises a yaw angle, a pitch angle, and a roll angle; as the preset condition, the yaw angle is smaller than or equal to a preset yaw angle threshold, the pitch angle is smaller than or equal to a preset pitch angle threshold, the roll angle is smaller than or equal to a preset roll angle threshold, and the score vector corresponding to the facial pose information is larger than or equal to a preset score.

6. The method according to claim 1, wherein the step of determining the user recognition result of the facial image to be subjected to the recognition according to the target facial feature of the facial image to be subjected to the recognition comprises:

determining similarities between the target facial feature of the facial image to be subjected to the recognition and preset user facial features; and taking user information corresponding to a preset user facial feature of the preset user facial features with a largest similarity as the user recognition result of the facial image to be subjected to the recognition.

* * * * *